US012697910B2

(12) United States Patent (10) Patent No.: US 12,697,910 B2
Sadoo et al. (45) Date of Patent: Aug. 4, 2026

(54) ENHANCED VEHICLE SEAT VENTILATION AND CONSTRUCTION TECHNIQUES

(71) Applicant: Tesla, Inc., Austin, TX (US)

(72) Inventors: Olav Sadoo, San Jose, CA (US);
Cheng Hao Yuan, Fremont, CA (US);
Matthew Hoolahan, San Francisco, CA
(US); Therese Hallberg, Los Gatos,
CA (US)

(73) Assignee: Tesla, Inc., Austin, TX (US)

( * ) Notice: Subject to any disclaimer, the term of this
patent is extended or adjusted under 35
U.S.C. 154(b) by 248 days.

(21) Appl. No.: 18/566,045

(22) PCT Filed: Jun. 7, 2022

(86) PCT No.: PCT/US2022/032553
§ 371 (c)(1),
(2) Date: Nov. 30, 2023

(87) PCT Pub. No.: WO2022/261131
PCT Pub. Date: Dec. 15, 2022

(65) Prior Publication Data
US 2024/0253542 A1 Aug. 1, 2024

Related U.S. Application Data

(60) Provisional application No. 63/202,400, filed on Jun.
9, 2021.

(51) Int. Cl.
*B60N 2/56* (2006.01)
(52) U.S. Cl.
CPC ........... *B60N 2/565* (2013.01); *B60N 2/5642*
(2013.01)

(58) Field of Classification Search
CPC .... B60N 2/565; B60N 2/5657; B60N 2/5642;
B60N 2/5685; B60N 2/7017; B60N
2/5628; B60N 2/64
See application file for complete search history.

(56) References Cited

U.S. PATENT DOCUMENTS

| 6,986,822 | B1 | 1/2006 | Poulakis |
| 10,449,877 | B1 | 10/2019 | Tait et al. |

(Continued)

FOREIGN PATENT DOCUMENTS

| CN | 117715792 | 3/2024 |
| EP | 4351923 | 4/2024 |

(Continued)

OTHER PUBLICATIONS

"International Application Serial No. PCT US2022 032553, International Preliminary Report on Patentability mailed Mar. 25, 2024", 8 pgs.

(Continued)

*Primary Examiner* — Shin H Kim
(74) *Attorney, Agent, or Firm* — Schwegman Lundberg &
Woessner, P.A.

(57) ABSTRACT
A vehicle seat with enhanced ventilation, and construction techniques for the enhanced ventilation, are described herein. An example vehicle seat includes an exterior formed of an air permeable mesh and a molded foam below the exterior. The molded foam has first holes which allow air to pass therethrough. The vehicle seat further includes a rigid duct connected to the molded foam, with the rigid duct having second holes which line up with the first holes. The vehicle seat further includes a fan, with the fan drawing air from an ambient source through the exterior and into the rigid duct.

17 Claims, 12 Drawing Sheets

(56) References Cited

U.S. PATENT DOCUMENTS

| | | | | |
|---|---|---|---|---|
| 10,471,864 | B1 * | 11/2019 | Tait | B60N 2/565 |
| 10,556,526 | B2 * | 2/2020 | Tait | B60N 2/5657 |
| 2004/0164594 | A1 | 8/2004 | Stoewe et al. | |
| 2007/0040421 | A1 * | 2/2007 | Zuzga | B60N 2/5621 |
| | | | | 297/180.13 |
| 2009/0152909 | A1 * | 6/2009 | Andersson | B60N 2/5642 |
| | | | | 297/180.13 |
| 2009/0243365 | A1 | 10/2009 | Lein et al. | |
| 2016/0114709 | A1 | 4/2016 | Kim et al. | |
| 2017/0210258 | A1 * | 7/2017 | Cheon | B60N 2/56 |
| 2019/0329681 | A1 * | 10/2019 | Tait | B60N 2/64 |
| 2019/0344687 | A1 * | 11/2019 | Tait | B60N 2/565 |
| 2019/0344688 | A1 * | 11/2019 | Tait | B60N 2/5692 |
| 2019/0375316 | A1 * | 12/2019 | Arata | B60N 2/7017 |
| 2020/0025424 | A1 * | 1/2020 | Cauchy | B60N 2/5657 |
| 2022/0017003 | A1 * | 1/2022 | Carraro | B60N 2/5657 |
| 2024/0253542 | A1 * | 8/2024 | Sadoo | B60N 2/565 |

FOREIGN PATENT DOCUMENTS

| | | |
|---|---|---|
| FR | 3072912 | 5/2019 |
| JP | 2014136423 | 7/2014 |
| WO | WO 2020/098975 | 5/2020 |
| WO | 2022261131 | 12/2022 |

OTHER PUBLICATIONS

"European Application Serial No. 22820914.4, Response filed Apr. 25, 2024 to Communication pursuant to Rules 161(1) and 162 EP", 9 pgs.

"European Application Serial No. 22820914.4, Extended European Search Report mailed Mar. 20, 2025", 9 pgs.

International Search Report and Written Opinion dated Sep. 8, 2022 in application No. PCT/US22/32553.

* cited by examiner

102

Molded Foam

Integrated Duct

Insulator Pad

Cushion Exploded View

Fan Assembly

104

104

Backrest Exploded View

Molded Foam

Rigid Duct Exterior

Suction Fan

Retainer Clip

Hardened Fleece Duct

300

Backrest section view, showing the air channel enclosed by the hardened fleece and the plastic closeout Upper half of foam molding tool Foam
Injection
502

Lower half of foam molding tool

504

ENHANCED VEHICLE SEAT VENTILATION AND CONSTRUCTION TECHNIQUES

INCORPORATION BY REFERENCE TO ANY PRIORITY APPLICATIONS

This application claims priority to U.S. Provisional Patent Application 63/202,400 filed Jun. 9, 2021 and titled "ENHANCED VEHICLE SEAT VENTILATION AND CONSTRUCTION TECHNIQUES," the disclosure of which is hereby incorporated herein by reference in its entirety.

BACKGROUND

Technical Field

The present disclosure relates to seats for use in automotive vehicles, and more particularly, to enhanced vehicle seat ventilation for an automotive seat.

Description of Related Art

Certain vehicles may include seats which are designed to cool occupants of the seats. For example, a vehicle seat may be designed such that air is output onto a back of an occupant. The air may help with ventilation to improve comfort of the occupant while driving a vehicle. However, current techniques for seat ventilation have disadvantages, such as complexity of manufacture.

Figure 1:
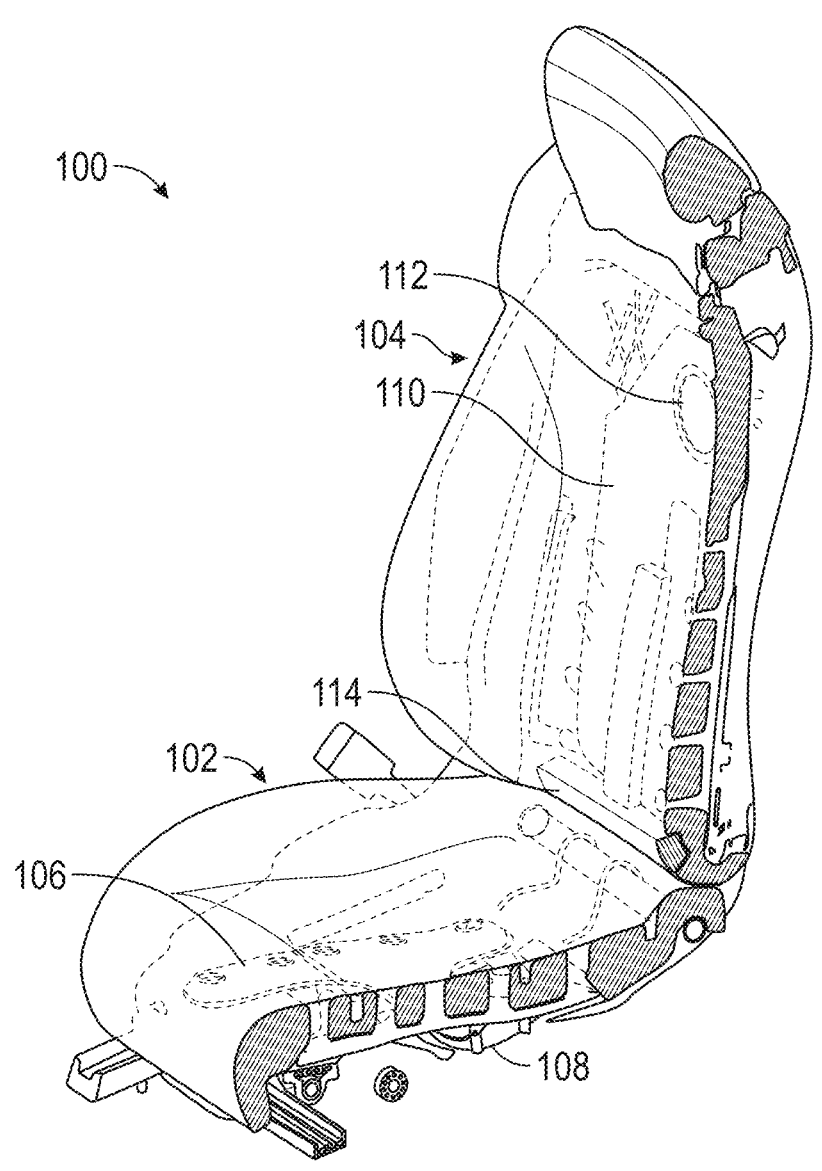
FIG. 1 illustrates an example vehicle seat with enhanced ventilation according to the techniques described herein.
Figure 1:
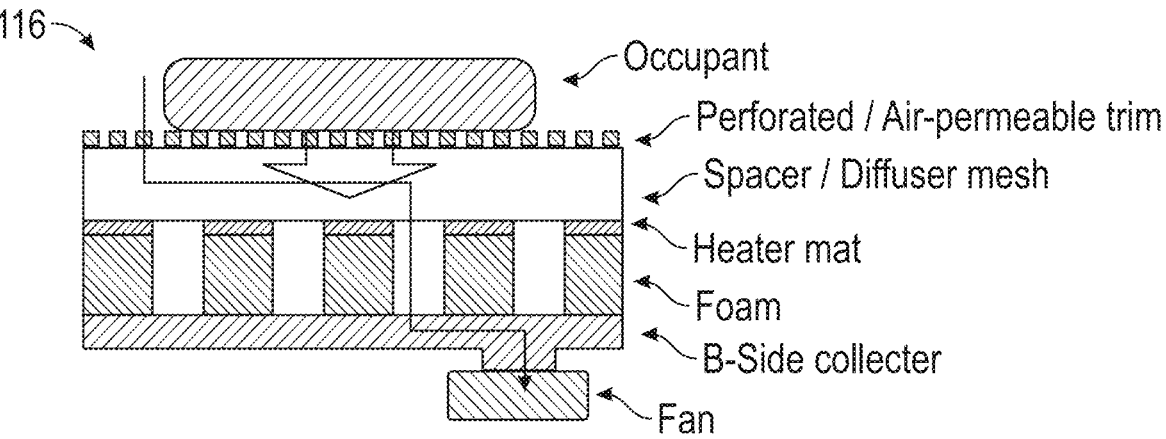

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

This application describes a vehicle seat with enhanced ventilation. The vehicle seat may be an example of a vehicle seat used by a driver of a vehicle. The vehicle seat may also be used by a passenger of the vehicle, such as a front or rear passenger. For convenience, this application describes a person using the vehicle seat as an occupant of the vehicle seat. As will be described, the vehicle seat may include a ventilation system configured to draw in air, or push out air, via the vehicle seat. For example, air may be drawn into the vehicle seat from ambient air. As another example, air may be pushed out to the occupant. The movement of air may allow for ventilation, such as cooling, of the occupant.

The ventilation system described herein may include a rigid duct assembly and integrated foam. One or more fans may be used to pull, or push, air through the vehicle seat as described above. As will be described, the rigid duct assembly may allow for a contoured shape for added comfort of an occupant. The rigid duct assembly may also improve upon prior ventilation techniques which used, for example, bags for flow of air through a vehicle seat. For example, the rigid duct assembly may prevent collapsing to ensure airflow.

As may be appreciated, the vehicle seat includes a seat bottom and a seat back. The seat bottom may represent a portion on which the occupant sits. The seat back may represent a portion on which the occupant's back rests. In some embodiments, the seat bottom may include a first rigid duct which is formed with a rigid exterior (e.g., on the top and bottom). The seat back may include a second rigid duct which is formed with a rigid (e.g., plastic resin) exterior (rear portion) and a hardened fleece (e.g., polyester) which is molded into foam of the seat back.

One or more fans may be connected (e.g., in fluidic connection) with the above-described first rigid duct and second rigid duct. The integrated foam of the seat bottom may include holes (e.g., intake holes) which are connected with the first rigid duct. Thus, a fan may be used to draw in air from the ambient, through the holes of the seat bottom and into the first rigid duct. Air drawn in via the fan may be expelled through a lower portion of the seat bottom.

Similarly, the integrated foam of the seat back may include holes (e.g., intake holes) which are connected with the second rigid duct. A fan may be similarly used to draw in air from the ambient, through the holes of the seat back and into the second rigid duct. Air may then be expelled through a rear portion of the seat back. Air may optionally be routed from the fan through a lower portion of the vehicle seat using one or more ducts.

As described below, with respect to at least FIGS. 5A-5B, the integrated foam may be molded directly over one of the rigid ducts. For example, a molding tool may be placed over a rigid duct which will be included in the seat bottom. In this example, the molding tool may have pillars (e.g., metal pillars) which are positioned to create the resulting holes in the molded integrated foam. These pillars may be lined up with corresponding holes of the rigid duct. The corresponding holes may have seals (e.g., soft seals) which cause the pillars to form respective seals against the holes of the rigid duct. For example, the seals may be at the edges of the holes and the pillars may cause them to stretch downwards thus sealing the holes from injected foam. Thus, when foam is injected into the molding tool, the foam is blocked from entering the rigid duct. In this way, the rigid duct may remain free of foam. Additionally, when the pillars are removed the seals will return to their prior configuration such that the holes remain open.

The rigid duct may, in some embodiments, be designed to provide rigidity against compression in the vertical direction (thus preserving the airflow channel). For example, as an occupant sits on the seat bottom the rigid duct may preserve airflow. The rigid duct may also include slit features to allow for at least some (e.g., a threshold measure of) flexibility in the overall structure. For example, the rigid duct can bend at the slits while maintaining the cross section. The purpose of this flexibility is, as an example, to maintain seat comfort.

Thus, the enhanced vehicle seat described herein may provide for better sealing along an entire air path (e.g., using the rigid duct). Additionally, higher airflow efficiency may allow for increased heat transfer capability. The use of the above-described molding tool may allow for improved manufacturing process and construction of the vehicle seat. Furthermore, the resulting vehicle seat may be more durable. For example, the vehicle seat may have a mesh (e.g., a Kufner mesh or other mesh) to increase durability of surface materials (e.g., an air permeable trim on top of the seat bottom or seat back).

These and other concepts will now be described in more detail with reference to the figures.

FIG. 1 illustrates an example vehicle seat 100 with enhanced ventilation according to the techniques described herein. The vehicle seat 100 includes a seat bottom 102 and a seat back 104.

The vehicle seat 100 includes a first rigid duct 106 in the seat bottom 102. As described herein, the first rigid duct 106 may be used to draw air into the seat bottom 102 from the ambient. For example, a fan 108 may be used to draw air into the seat bottom 102 (e.g., from a top of the seat bottom 102). In some embodiments, the fan 108 may be used to push air into the seat bottom 102 (e.g., out of the top of the seat bottom 102). As will be described in FIGS. 2A-2C, the seat bottom 102 may include holes in the first rigid duct 106 (e.g., openings in the top of the duct) which line up with, or are otherwise in fluidic communication or connection with, holes of the foam portion of the seat bottom 102.

The vehicle seat 100 includes a second rigid duct 110 in the seat back 104. As described herein, the second rigid duct 110 may be used to draw air into the seat back (e.g., via fan 112). Similar to the above, the fan 112 may be used to push air into the seat back 104. As described in FIGS. 3A-3D, the seat back 106 may include holes in the second rigid duct 110 which line up with, or are otherwise in fluidic communication or connection with, holes of the foam portion of the seat back 104.

Figure 3A:
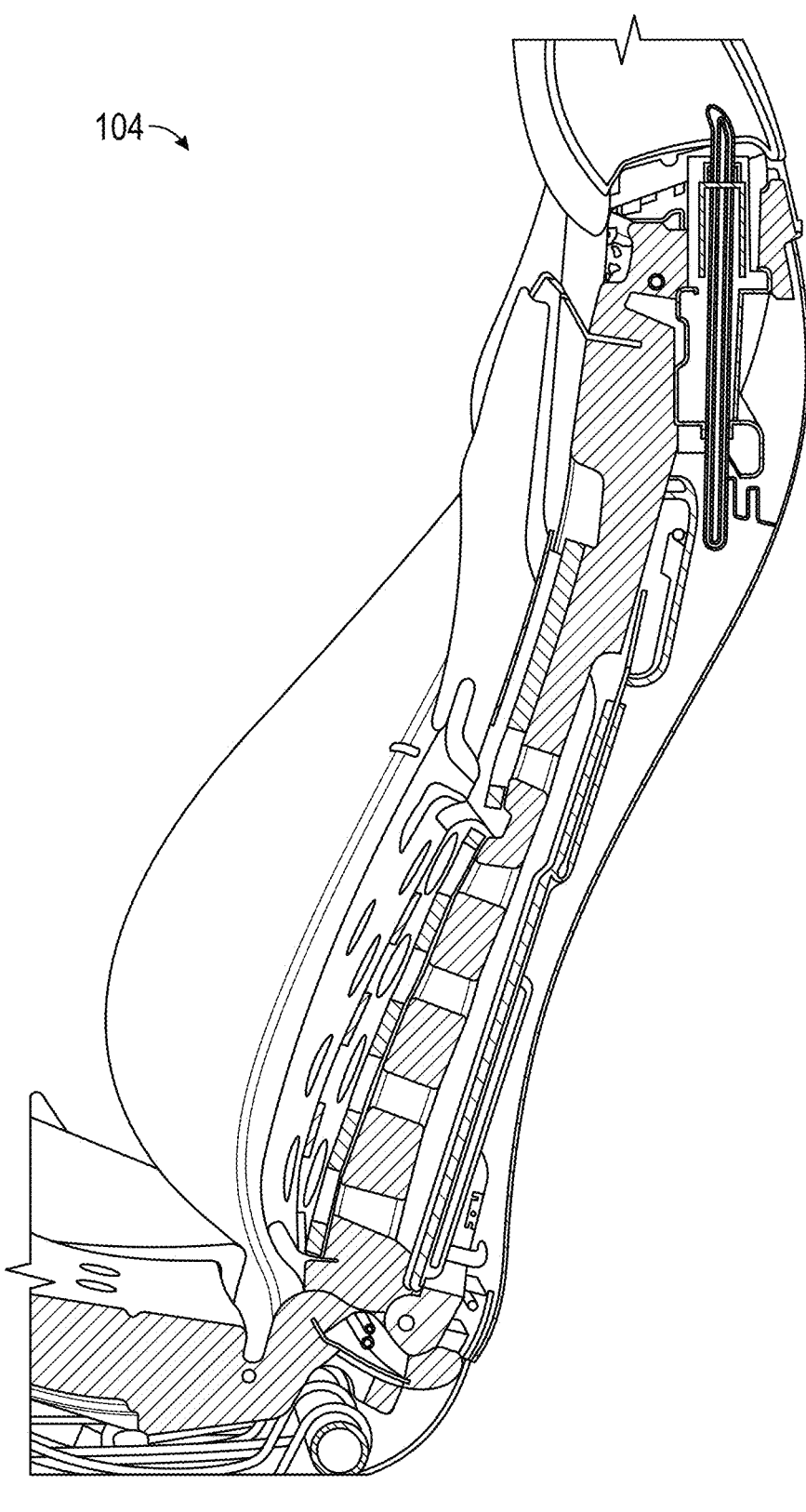
FIG. 3A illustrates a seat back of the example vehicle seat with a rigid duct included in the seat back.
Figure 3B:
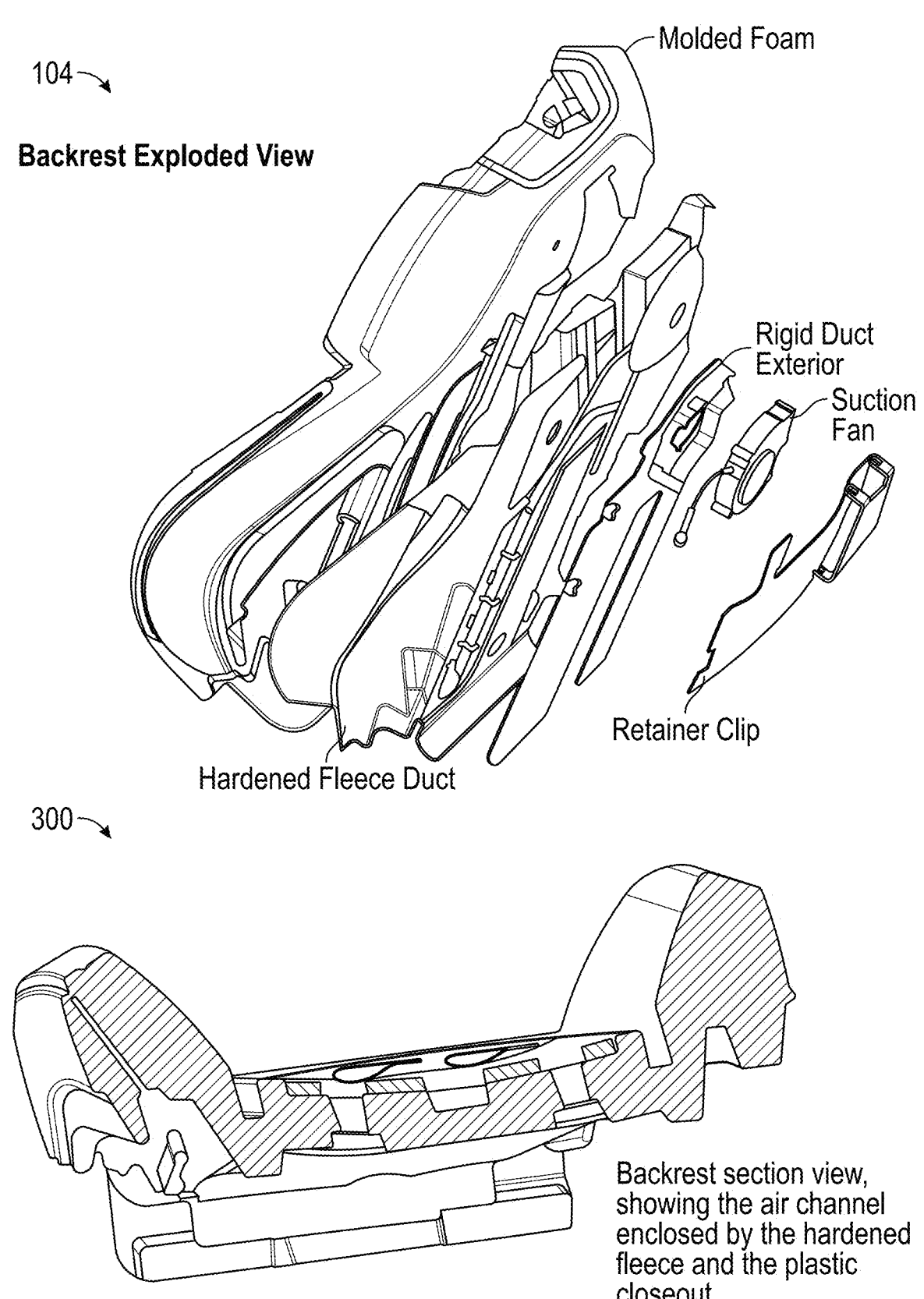
FIG. 3B illustrates a detailed view of the seat back.
Figure 3C:
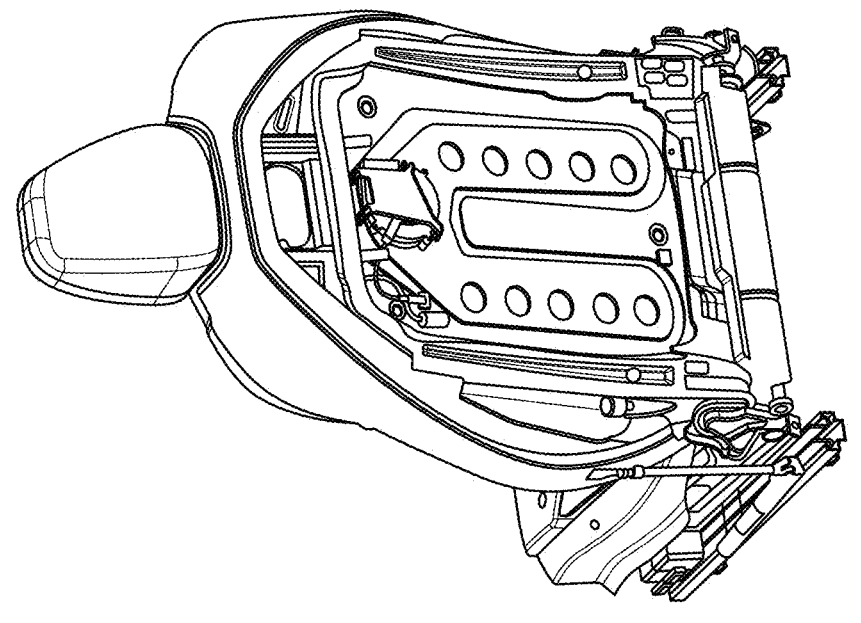
FIG. 3C illustrates additional detailed views of the seat back.
Figure 3C:
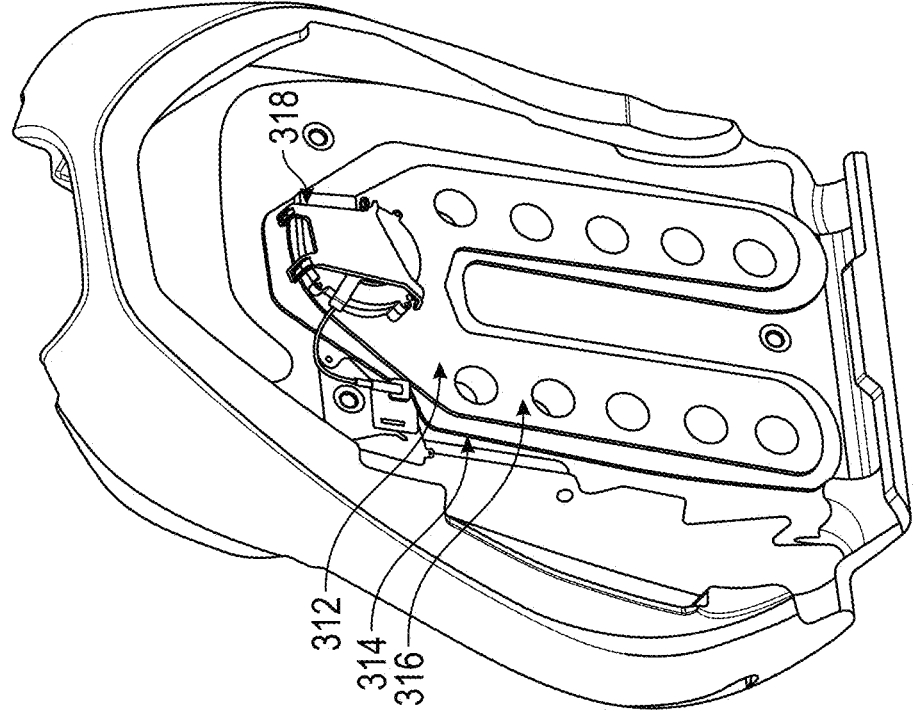
Figure 3D:
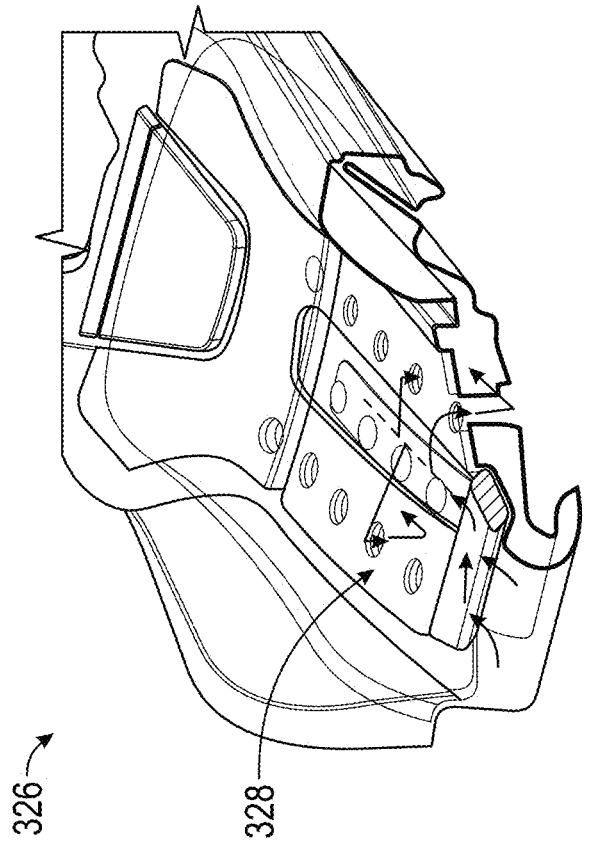
FIG. 3D illustrates an example ventilation bar included in the seat back.
Figure 3D:
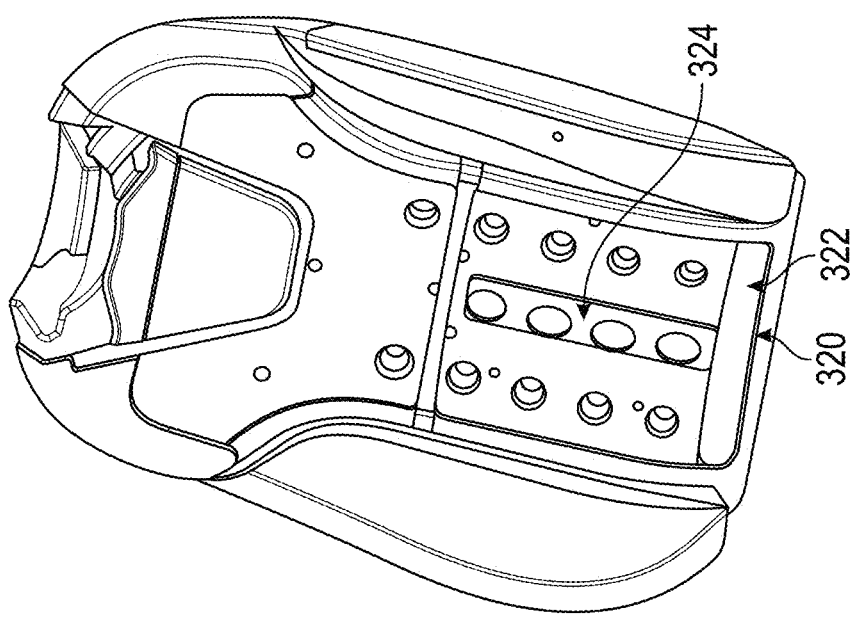

In some embodiments, and as described in FIG. 3D, a ventilation bar 114 (e.g., a T-bar) may be used to improve cooling. For example, air may be drawn into openings of the ventilation bar 114 (e.g., at the bottom). In this example, and as may be appreciated, an occupant is less likely to be covering this portion of the vehicle seat 100 with his/her body (e.g., the bight line). The ventilation bar 114 may be substantially porous (e.g., made of reticulated foam), such that air is drawn up the backrest area, circulated behind the occupant, and then into the back-side channels (e.g., the channels or holes of the foam and second rigid duct 110).

Portion 116 illustrates an example exploded view or detailed view of the vehicle seat 100. For example, portion 116 may illustrate a detailed view of the seat bottom 102 described above. The seat bottom 102 may thus be formed from an exterior perforated trim, then a spacer or diffuser mesh, a heater mat, integrated foam (e.g., with illustrated holes), a b-side collector (e.g., the rigid duct 106), and a fan (e.g., fan 108). In some embodiments, an occupant sensor may be included to detect presence, pressure, weight, and so on, associated with an occupant.

Figure 2A:
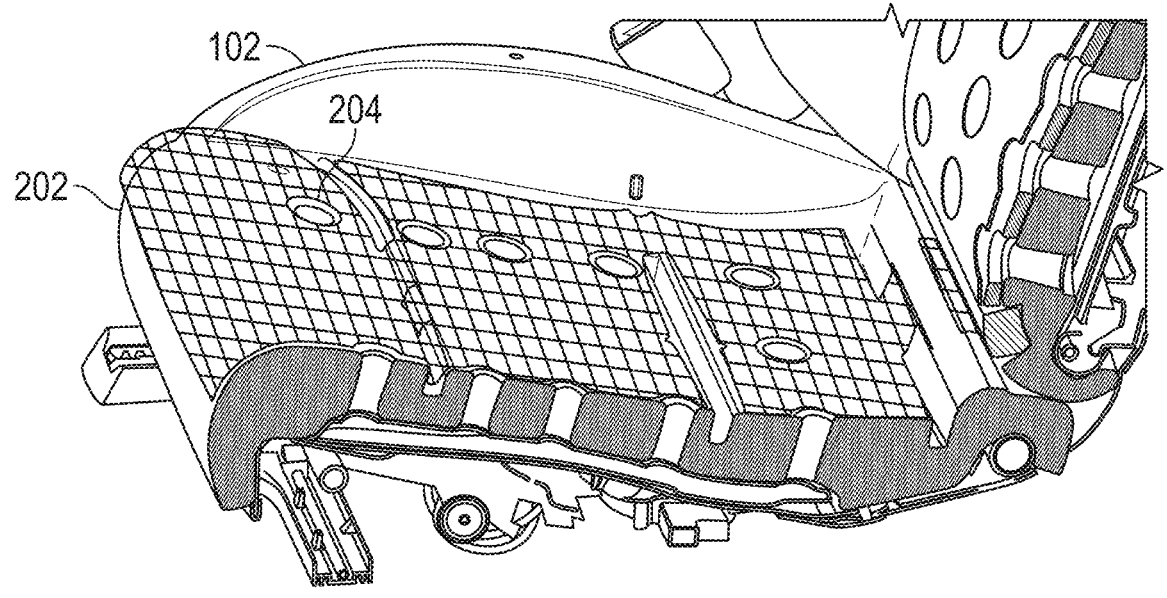
FIG. 2A illustrates a seat bottom of the example vehicle seat with a rigid duct included in the seat bottom.
Figure 2A:
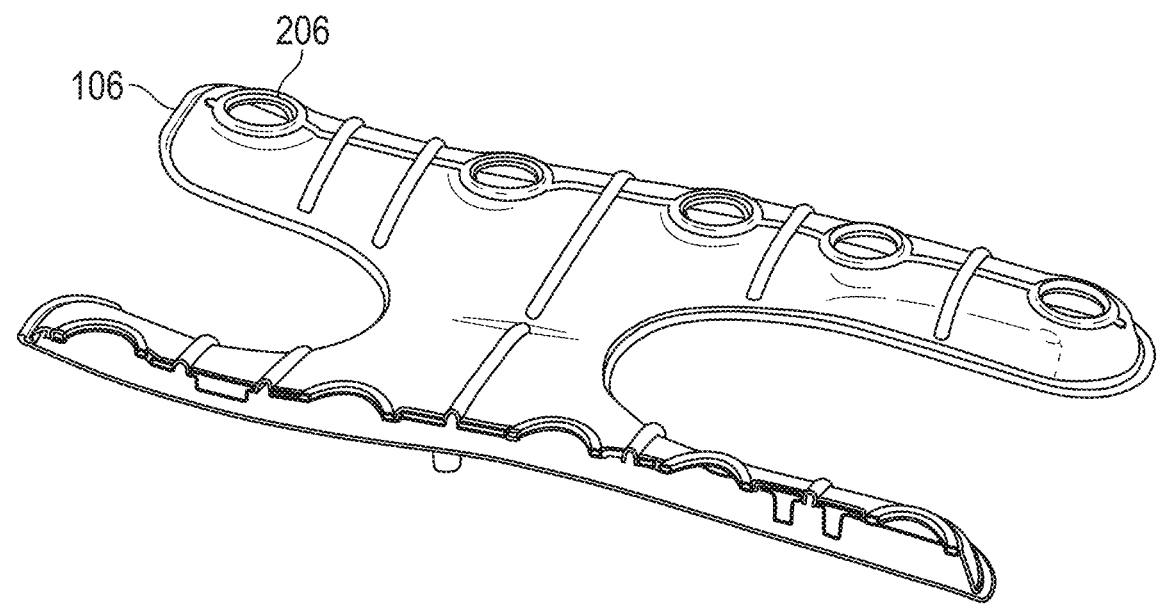

FIG. 2A illustrates a seat bottom 102 of the example vehicle seat 100 with a rigid duct 106 (e.g., a plastic resin duct) included in the seat bottom 102. The illustrated example includes integrated foam 202 with example holes (e.g., hole 204). These holes, as illustrated, may substantially be in line with the rigid duct 106 (e.g., hole 206). A fan may be connected to a portion of the rigid duct 106 (e.g., a lower portion), and used to draw air through the integrated foam 202 into the rigid duct 106. The rigid duct 106 may have a plastic top and bottom such that a channel is formed in which air can be drawn. The rigid duct 106 may be, for example, an 'H-shape' such that air is drawn substantially around the occupant (e.g., a portion touching the seat bottom 102).

Figure 2B:
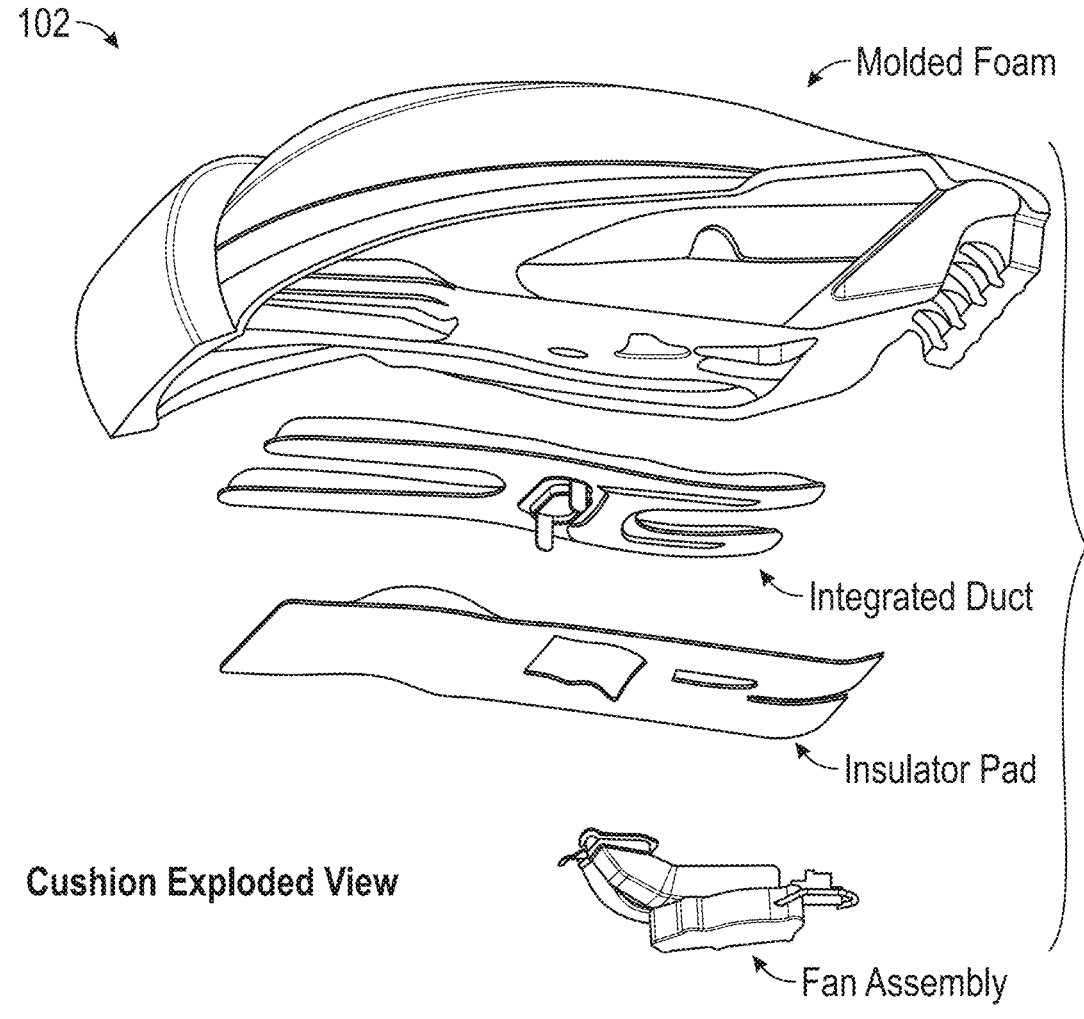
FIG. 2B illustrates a detailed view of the seat bottom.

FIG. 2B illustrates a detailed view of the seat bottom 102. As illustrated, the seat bottom 102 may include molded foam (e.g., the integrated foam), an integrated duct (e.g., the rigid duct described above), an insulator pad, and a fan assembly. In some embodiments, the rigid duct may be connected with the molded foam via adhesive (e.g., glue). In some embodiments, and as described in FIGS. 5A-5B, the foam may be formed onto the rigid duct via a foam molding process.

The rigid duct may have a contour to allow for added comfort for the occupant. For example, when an occupant sits on the seat bottom 102, the foam may compress. The rigid duct's contour shape may thus be designed to form to a shape which is comfortable for the occupant.

Figure 2C:
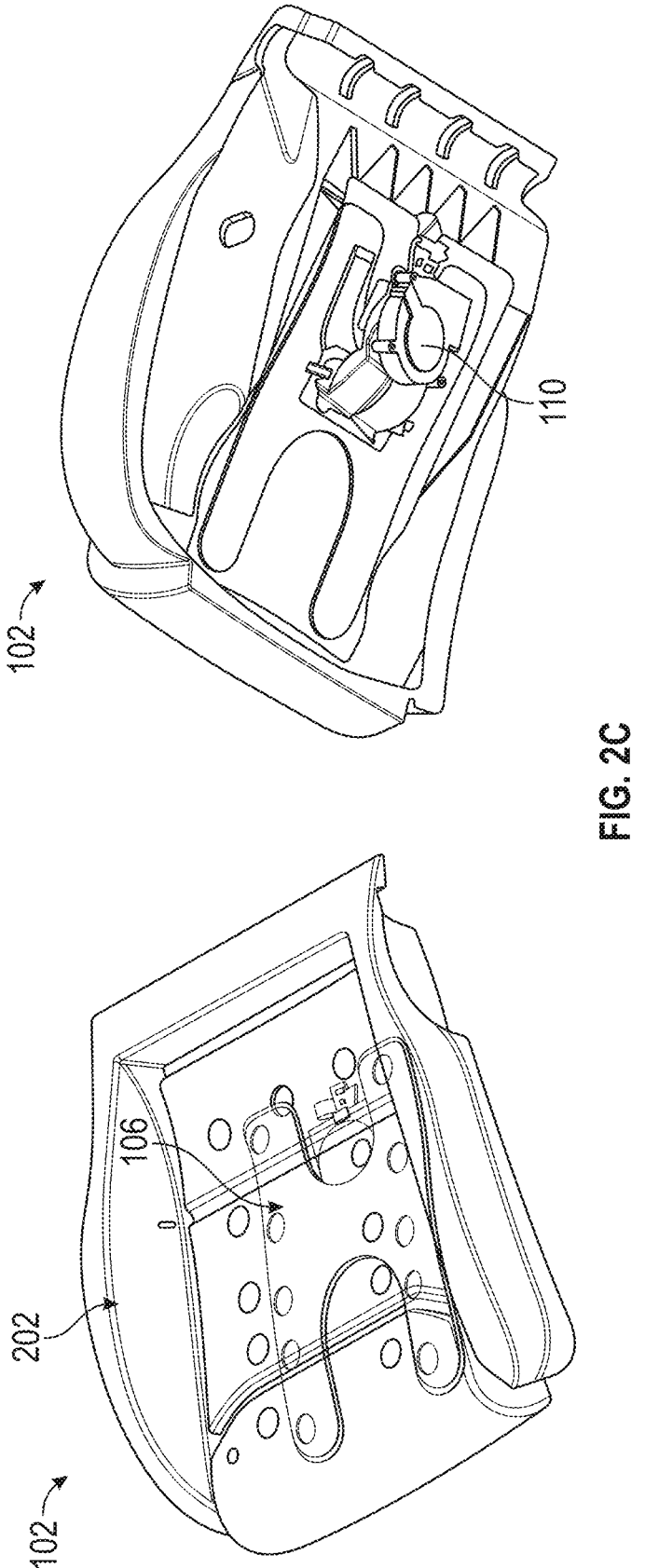
FIG. 2C illustrates an additional detailed view of the seat bottom.

FIG. 2C illustrates an additional detailed view of the seat bottom 102. The illustrated example depicts the seat bottom 102 with the integrated foam 202 and the rigid duct 106. Additionally, the fan 108 on the bottom of the seat bottom 102 is illustrated. Thus, the rigid duct 106 is positioned below the integrated foam 202 and above the fan 108 in the illustrated embodiment.

FIG. 3A illustrates a seat back 104 of the example vehicle seat 100 with a rigid duct included in the seat back. FIG. 3B illustrates a detailed view of the seat back 104. In the illustrated embodiment, the seat back 104 includes integrated foam. The seat back 104 further includes a hardened fleece, which may be formed on or otherwise included on, the integrated foam. For example, the fleece may be included on a bottom portion of the foam (e.g., in the interior of the seat back 104). In some embodiments, the foam slurry or mixture may be poured or formed over the fleece. A rigid duct exterior (e.g., a plastic resin) may then be included. For example, the rigid duct exterior may be connected to the fleece (e.g., via adhesive, such as glue). The seat back 104 further includes a fan (e.g., suction fan as illustrated) which is used to draw air from an ambient air source, through the foam, into the duct (e.g., the combination of the fleece and rigid duct exterior), and out through the fan.

Thus, the rigid duct in the seat back 104 may be formed from the fleece and a rigid portion. The fleece may represent a top portion of the rigid duct and the rigid portion may represent a bottom portion of the rigid duct. The combination of these may create a channel from which air may be drawn by the fan.

In some embodiments, hook and loop fasteners may be used to attach the rigid duct exterior to the hardened fleece on the molded foam. This may allow for simpler and/or faster assembly of the seat back 104.

Portion 300 illustrates a top view of the seat back 104. This view illustrates a channel which is enclosed by the fleece and rigid duct exterior (e.g., plastic closeout).

FIG. 3C illustrates additional detailed views of the seat back 104. These views 310 depict the rigid duct 312 (e.g., formed from the fleece 314 and rigid exterior 316). As described herein, the foam may have holes which line up with the rigid duct. For example, the holes may terminate at an exterior of the foam. In this example, the fleece 314 may similarly have holes which line up with the holes of the foam. The rigid exterior 316 may then have holes which line up with the holes of the fleece 314. The fan 318 may then connect to the rigid exterior 316, such that the fan can cause air to flow through the channel created by the combination of the fleece 314 and rigid exterior 316. In the illustrated example, the fan is connected to an upper portion of the rigid exterior 316.

FIG. 3D illustrates an example ventilation bar 320 included in the seat back 104. The ventilation bar 320 may be, in some embodiments, a T-shape as illustrated in FIG. 1. In some embodiments, the ventilation bar 320 may be included in the seat back 104 under a top layer (e.g., a perforated trim layer, such as a polyurethane layer). The ventilation bar 320 may additionally be separate from the foam of the seat back 104. For example, and as described below, an upper part of the ventilation bar 320 may be included substantially flush or in line with the molded foam.

The ventilation bar 320 may include a first portion 322 used to draw air into the ventilation bar 320. For example, the first portion 322 may be positioned at a lower part of the seat back 104. This lower part may correspond to a lower back of an occupant and may be referred to as a bight line. In some embodiments, the first portion 322 may be a substantially non-porous material (e.g., plastic). For example, holes at the extremities of the first portion 322 (e.g., in a horizontal direction, such as the left and right) may draw in, or otherwise air to flow into, the holes. In some embodiments, the first portion 322 may be porous (e.g., reticulated foam). The ventilation bar 320 may include a second portion 324 which extends up at least a portion of the seat back 104. The second portion 3424 may be porous (e.g., reticulated foam), such that air can be drawn from the air pulled, or otherwise obtained, at the bight line. As may be appreciated, an occupant may substantially cover the seat back 104 with his/her body. Thus, the air from the bight line may allow for continual air to be drawn into the seat back 104.

As illustrated in portion 326, air may be drawn into the first portion 322, and then flow out of the second portion 324 into holes of the molded foam 328. For example, the fan (e.g., fan 318) may create a suction or flow which causes movement of the air through the first portion 322, into the second portion 324, and then into the holes of the foam 328 which connect to the fan via the rigid duct. Thus, the air may be drawn about the occupant's back, into the holes of the foam 328, into the rigid duct (e.g., the combination of the fleece and rigid exterior), and out through the fan illustrated in FIGS. 3B-3C.

Figure 4:
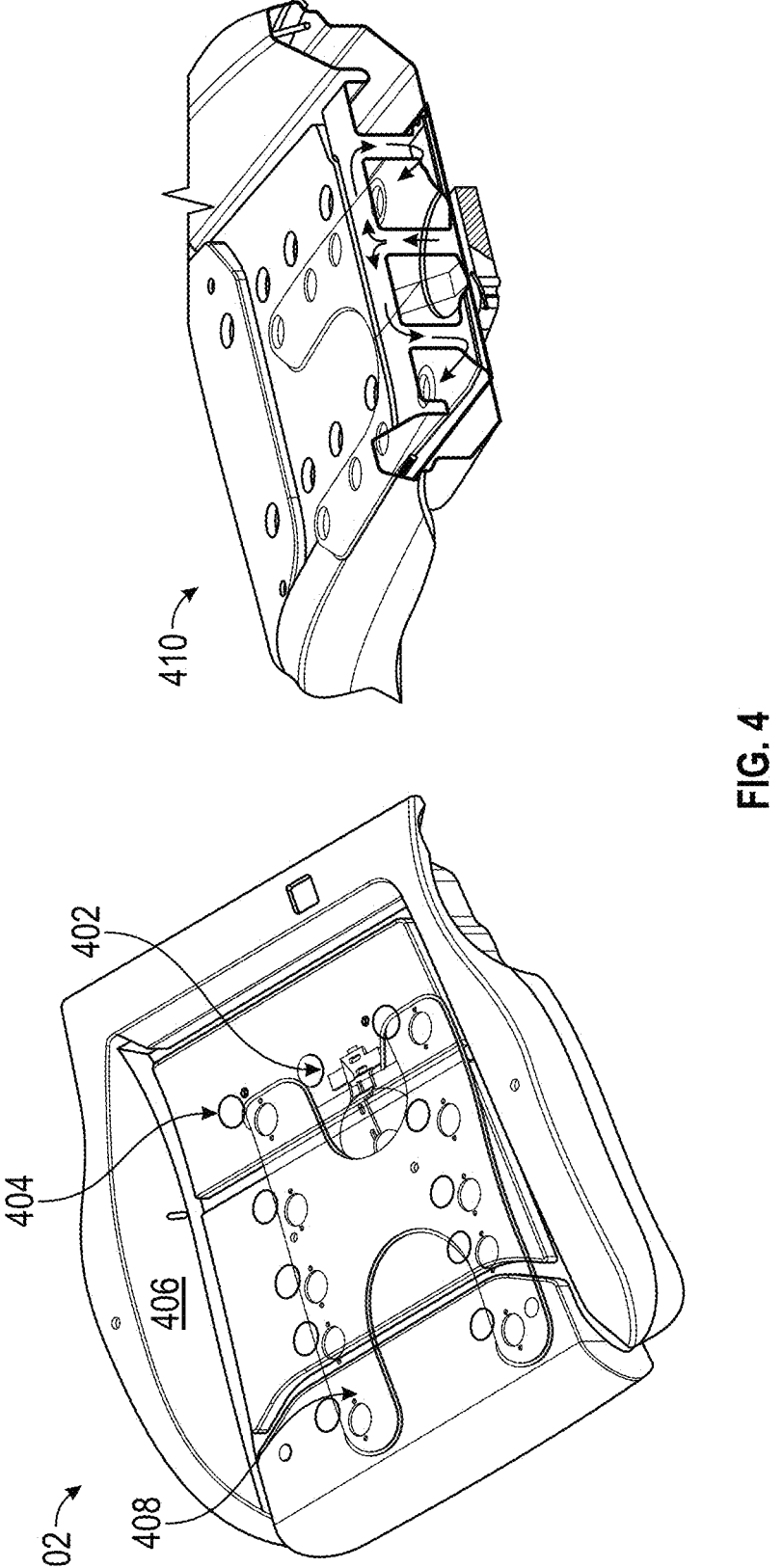
FIG. 4 illustrates an example ventilation hole in the seat bottom.

FIG. 4 illustrates an example ventilation hole 402 in the seat bottom 102. As described herein, the foam of the seat bottom 102 may have holes which line up with holes of a rigid duct. The rigid duct may be connected to a fan, which causes air to be drawn through the seat bottom 102 from ambient. In the illustrated embodiment, a hole 404 is depicted as being included in the foam 406 and in line with a corresponding hole in the rigid duct 408.

In some embodiments, a hole 402 which is not connected to the rigid duct 408 may be included in the foam 406. For example, FIG. 4 illustrates the hole 402 as a rear center hole. This hole 402 may be connected to ambient instead of the rigid duct 408. The hole 402 may provide additional source of fresh air and allows for more effective circulation under the occupant (e.g., therefore improved cooling). Portion 410 illustrates example airflow caused by a fan as described herein.

Figure 5A:
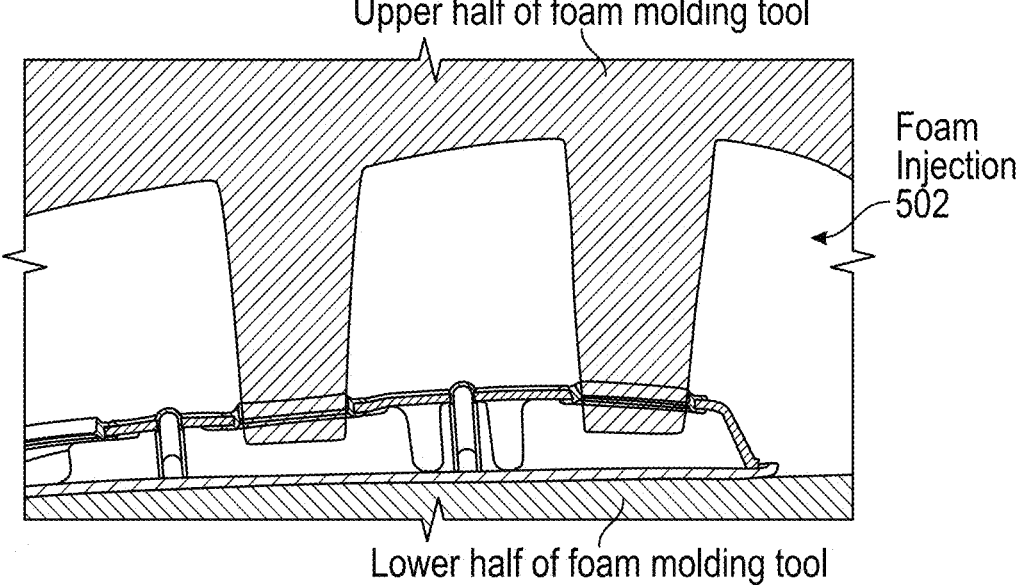
FIG. 5A illustrates an example technique for molding the molded foam included in the seat bottom.
Figure 5A:
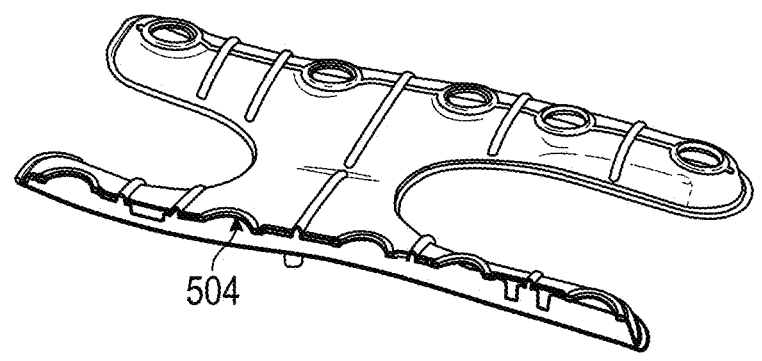

FIG. 5A illustrates an example technique for molding the molded foam included in the seat bottom. In some embodiments, a molding tool may be used which includes pillars usable to form the holes in the foam (e.g., as illustrated at least in FIG. 2A with respect to hole 204). The pillars may be closed and formed of solid metal which are homogenous with the body of the molding tool. As described below, the integrated foam may be molded about (e.g., on top of) the rigid duct. In this way, manufacturing (e.g., construction) may be simplified.

Foam liquid may be sprayed into a molding cavity. For example, foam injection 502 may occur in portions of the cavity outside of the pillars. The molding tool may then be closed, and the liquid may undergo a chemical reaction to foam up and fill the cavity. Thus, the resulting molded foam may be formed. Holes may be retained in the resulting molded foam using the above-described pillars. Additionally, the resulting molded foam may be substantially affixed to the rigid duct. In some embodiments, adhesive may be applied to the rigid duct.

To ensure that foam does not flow into the rigid duct during the foam injection, seals 504 (e.g., soft seals) may be used to close the holes of the rigid duct. The seals may be, for example, rubber and may be overmolded to the rigid duct. In some embodiments, a two shot molding process may be used. The seals may be configured to grip and seal around the pillars to prevent foam ingress. The seals may have two lips and may be designed to seal in the axial and radial directions. The sealing may be formed when the pillar is inserted into the holes of the rigid duct and the foam molding tool is closed. For example, the seals may stretch to seal off the holes from the foam.

Figure 5B:
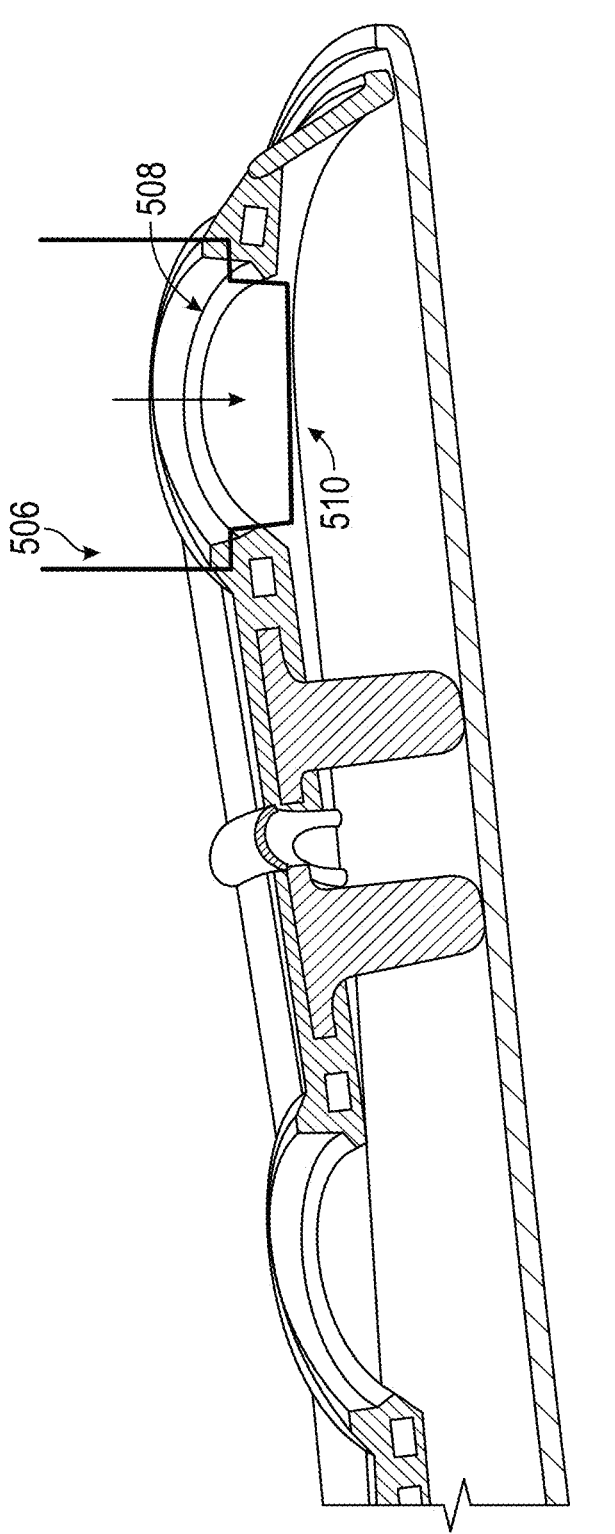
FIG. 5B illustrates detail of a pillar of a foam molding tool and integrated seal in the rigid duct.

FIG. 5B illustrates detail of a pillar 506 of a foam molding tool and integrated seal 508 in the rigid duct. As may be appreciated, the seal 508 may stretch when the pillar 506 is inserted into the hole. In this way, foam may be disallowed from entry into the rigid duct. Upon removal of the pillar 506, the hole 510 will remain open. For example, the seal 508 will return to its prior position at an exterior of the hole 510. In this way, air may be allowed to be drawn into, or pushed out of, the hole 510 as described herein by a fan. The seal 508 may be positioned, in some embodiments, at an upper portion of the hole 510.

The description above, in certain embodiments, described the rigid duct in the seat bottom as being a plastic unit which has a plastic top and bottom. The rigid duct in the seat back, in certain embodiments, may be formed from a fleece and plastic bottom. In some embodiments, the seat bottom may instead use the fleece and plastic bottom. In some embodiments, the seat back may use the plastic unit.

Figure 6:
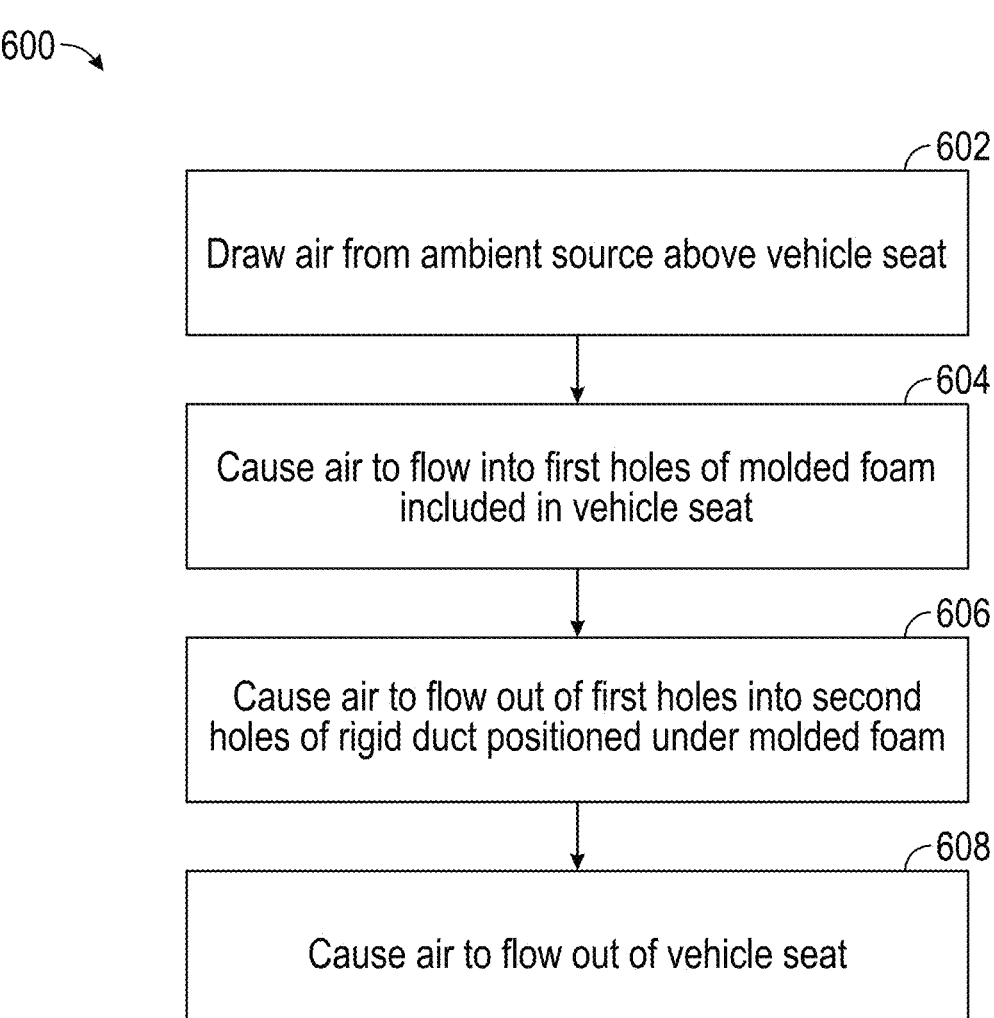
FIG. 6 illustrates an exemplary method of ventilating a vehicle seat according to the techniques described herein.

FIG. 6 illustrates a method 600 of ventilating a vehicle according to the techniques disclosed herein. The method 600 includes drawing air from ambient source above vehicle seat 602, causing air to flow into first holes of molded foam included in vehicle seat 604, causing air to flow out of first holes into second holes of rigid duct positioned under molded foam 606, and causing air to flow out of vehicle seat 608.

The foregoing disclosure is not intended to limit the present disclosure to the precise forms or particular fields of use disclosed. As such, it is contemplated that various alternative embodiments and/or modification to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the glass structure. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A vehicle seat comprising:
an exterior formed of an air permeable mesh;
a molded foam below the exterior, wherein the molded foam has a plurality of first holes configured to allow air to pass therethrough;
a rigid duct connected to the molded foam, the rigid duct having a plurality of second holes which, at least in part, line up with the plurality of first holes;
a fan configured to draw air from an ambient source through the exterior and into the rigid duct; and
a ventilation bar with a first portion and a second portion, the first portion being configured to draw air from a lower portion of the vehicle seat, and the second portion being configured to provide air to the plurality of first holes.

2. The vehicle seat of claim 1, wherein the rigid duct is below the molded foam.

3. The vehicle seat of claim 1, wherein the second portion is porous.

4. The vehicle seat of claim 1, wherein the rigid duct is formed of a top portion and a bottom portion, wherein the top portion and bottom portion are rigid plastic.

5. The vehicle seat of claim 1, wherein the rigid duct is formed of a top portion and a bottom portion, wherein the top portion is hardened fleece on a bottom of the molded foam and the bottom portion is rigid plastic affixed to the hardened fleece.

6. The vehicle seat of claim 1, wherein the molded foam was created using a foam tool, and wherein the plurality of first holes were formed using pillars of the foam tool, wherein the pillars were inserted into upper portions of the plurality of second holes, wherein the plurality of second holes include respective seals configured to close the plurality of second holes against the pillars, and wherein foam was inserted into a molding cavity using the foam tool to create the molded foam.

7. The vehicle seat of claim 6, wherein the inserted foam is blocked from entry into the rigid duct via the seals.

8. The vehicle seat of claim 6, wherein the seals are soft seals comprising rubber.

9. The vehicle seat of claim 6, wherein the seals were formed using a two-shot molding process.

10. A vehicle seat comprising:
a seat bottom comprising:
an exterior formed of an air permeable mesh,
a molded foam below the exterior, wherein the molded foam has a plurality of first holes configured to allow air to pass therethrough,
a first rigid duct connected to the molded foam, the first rigid duct having a plurality of second holes which, at least in part, line up with the plurality of first holes, and
a first fan, the first fan configured to draw air from an ambient source through the exterior and into the first rigid duct; and
a seat back comprising:
a second rigid duct having a plurality of third holes,
a fleece molded onto the seat back, and
a second fan configured to draw air through the plurality of third holes.

11. The vehicle seat of claim 10, wherein the fleece is a hardened fleece molded into foam of the seat back.

12. The vehicle seat of claim 10, wherein the seat back further composes a ventilation bar, wherein the ventilation bar is configured to have air drawn into a first portion positioned at a bight line and have air output from a second portion along the seat back.

13. The vehicle seat of claim 12, wherein the second portion is porous.

14. A method of ventilating a vehicle seat comprising:
inserting a molded foam below an exterior of the vehicle seat, wherein the exterior is formed of an air permeable mesh, and the molded foam has a plurality of first holes configured to allow air to pass therethrough;
connecting a rigid duct to the molded foam, wherein the rigid duct has a plurality of second holes which lines up with the plurality of first holes;
drawing air, via a fan, from an ambient source through the exterior and into the rigid duct; and
drawing air from a lower portion of the vehicle seat and providing the air from the lower portion of the vehicle seat to the plurality of first holes.

15. The method of claim 14, wherein the rigid duct is placed below the molded foam.

16. The method of claim 15, further comprising creating the molded foam using a foam tool, comprising forming the plurality of first holes using pillars of the foam tool, inserting the pillars into upper portions of the plurality of second holes, and inserting foam into a molding cavity using the foam tool.

17. The method of claim 16, wherein creating the molded foam further comprises blocking the inserted foam from entry into the rigid duct via respective seals configured to close the plurality of second holes against the pillars.

\* \* \* \* \*